(12) United States Patent
Varkey

(10) Patent No.: US 7,326,854 B2
(45) Date of Patent: *Feb. 5, 2008

(54) CABLES WITH STRANDED WIRE STRENGTH MEMBERS

(75) Inventor: Joseph Varkey, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/469,642

(22) Filed: Sep. 1, 2006

(65) Prior Publication Data

US 2007/0044991 A1    Mar. 1, 2007

Related U.S. Application Data

(63) Continuation-in-part of application No. 11/279,518, filed on Apr. 12, 2006.

(60) Provisional application No. 60/695,616, filed on Jun. 30, 2005.

(51) Int. Cl.
*H01B 7/18* (2006.01)

(52) U.S. Cl. .............................. 174/102 R; 174/126.1

(58) Field of Classification Search ............ 174/102 R, 174/106 R, 126.1, 126.2, 128.1, 128.2
See application file for complete search history.

(56) References Cited

U.S. PATENT DOCUMENTS

| | | | |
|---|---|---|---|
| 3,328,140 A | 6/1967 | Warren | |
| 3,482,034 A * | 12/1969 | Rhoades et al. | ......... 174/102 R |
| 3,490,125 A * | 1/1970 | Frieling, Jr. | ............... 428/592 |
| 3,681,514 A | 8/1972 | Rhoades et al. | |
| 3,758,704 A | 9/1973 | Naud | |
| 3,766,307 A | 10/1973 | Andrews, Jr. | |
| 4,059,951 A | 11/1977 | Roe | |
| 4,275,786 A | 6/1981 | Lee | |
| 4,409,431 A | 10/1983 | Neuroth | |
| 4,525,813 A | 6/1985 | Burrage | |
| 4,644,094 A | 2/1987 | Hoffman | |
| 4,722,589 A | 2/1988 | Priaroggia | |
| 4,743,711 A | 5/1988 | Hoffman | |
| 5,150,443 A | 9/1992 | Wijnberg | |
| 5,495,547 A | 2/1996 | Rafie | |
| 5,894,104 A | 4/1999 | Hedberg | |
| 6,559,385 B1 | 5/2003 | Johnson | |
| 6,600,108 B1 | 7/2003 | Mydur | |
| 7,119,283 B1 * | 10/2006 | Varkey et al. | .......... 174/102 R |

FOREIGN PATENT DOCUMENTS

| | | |
|---|---|---|
| EP | 0003104 | 1/1979 |
| FR | 2767861 | 9/1998 |
| GB | 2321973 | 8/1998 |
| WO | WO02071178 | 9/2002 |

* cited by examiner

*Primary Examiner*—Chau N. Nguyen
(74) *Attorney, Agent, or Firm*—David Cate; Jaime Castano; Dale Gaudier

(57) ABSTRACT

High strength cables formed from strength members. The strength members are formed from bimetallic filament wires which may be encased within a jacket of polymeric material. The bimetallic filament wires wherein the filaments include a high strength core and a corrosion resistant alloy clad forming the outer layer of the filament. The strength members may be used individually, as a central strength member, or even layered around a central axially positioned component or strength member, to form a layer of strength members. Cables of the invention may be of any practical design, including monocables, coaxial cables, quadcables, heptacables, slickline cables, multi-line cables, suspension cables, and the like.

12 Claims, 7 Drawing Sheets

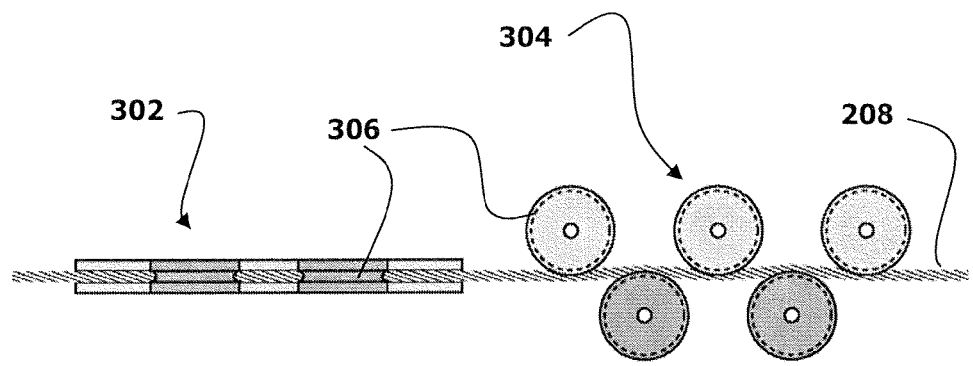
FIG 3
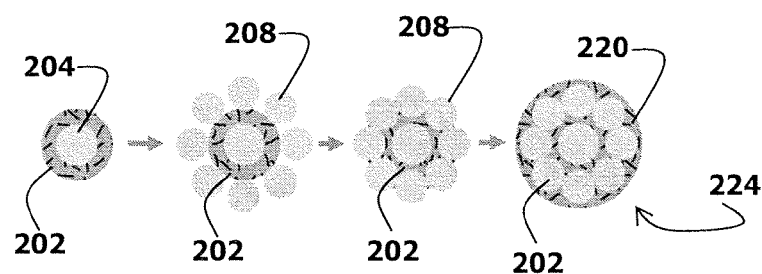
FIG 4
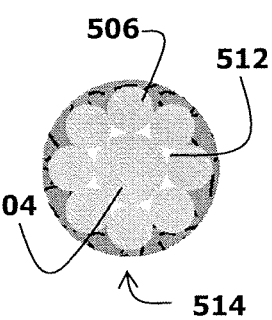 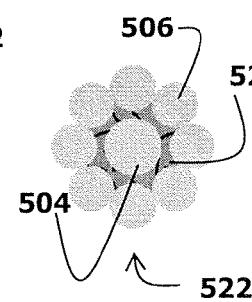 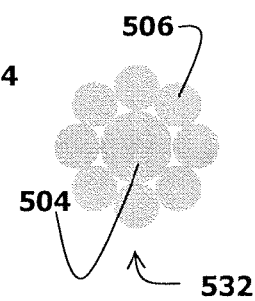
FIG 5A          FIG 5B          FIG 5C          FIG 5D

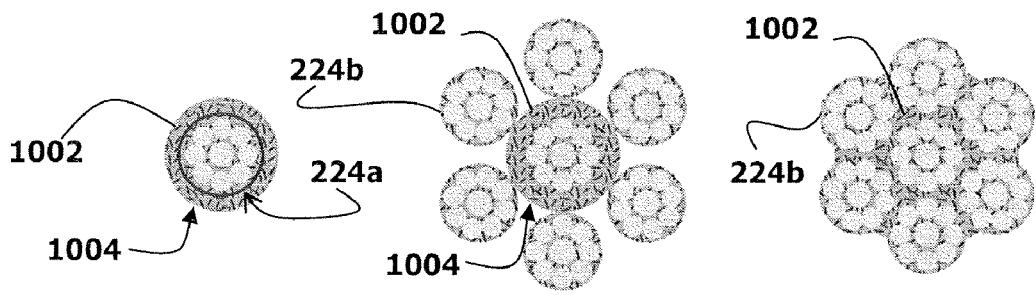
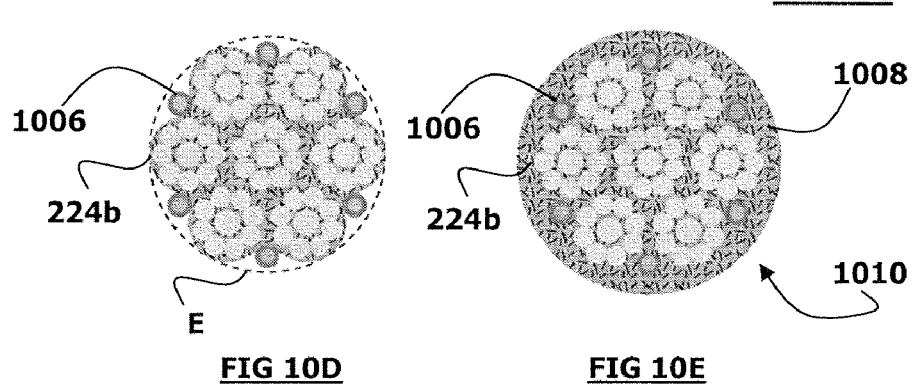
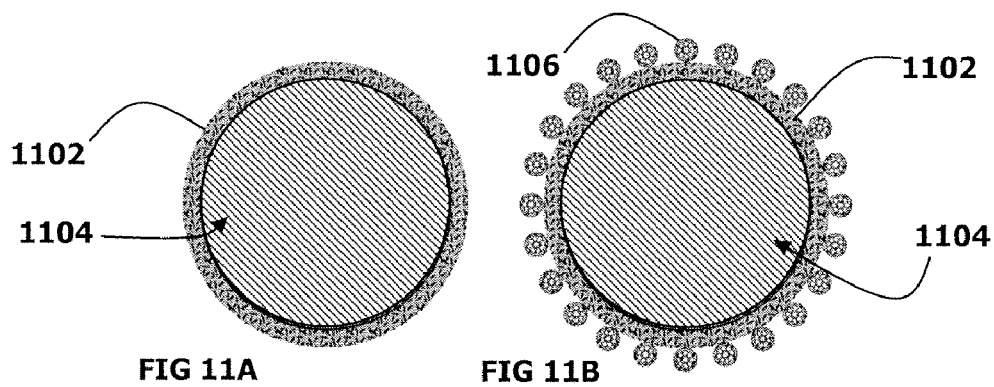
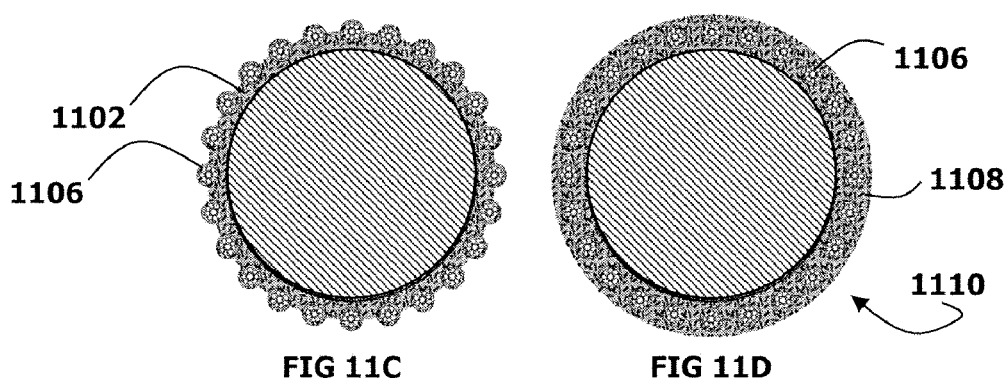

CABLES WITH STRANDED WIRE STRENGTH MEMBERS

RELATED APPLICATION DATA

This application is a Continuation-In-Part of and also claims the benefit of U.S. patent application Ser. No. 11/279,518, filed Apr. 12, 2006, a non-provisional application based upon provisional application Ser. No. 60/695,616, filed Jun. 30, 2005, and claims the benefit of the filing date thereof.

BACKGROUND OF THE INVENTION

This invention relates to armored wellbore logging cables. In some aspects, the invention relates to high strength cables based upon corrosion resistant stranded wire strength members used with devices to analyze geologic formations adjacent a wellbore, or to perform mechanical services in wellbores.

Generally, geologic formations within the earth that contain oil and/or petroleum gas have properties that may be linked with the ability of the formations to contain such products. For example, formations that contain oil or petroleum gas have higher electrical resistivity than those that contain water. Formations generally comprising sandstone or limestone may contain oil or petroleum gas. Formations generally comprising shale, which may also encapsulate oil-bearing formations, may have porosities much greater than that of sandstone or limestone, but, because the grain size of shale is very small, it may be very difficult to remove the oil or gas trapped therein. Accordingly, it may be desirable to measure various characteristics of the geologic formations adjacent to a well to help in determining the location of an oil- and/or petroleum gas-bearing formation as well as the amount of oil and/or petroleum gas trapped within the formation.

Tools, such as logging or mechanical services tools, may be lowered into the well to make measurements or perform tasks at different depths along the well. These tools may include gamma-ray emitters/receivers, caliper devices, resistivity-measuring devices, neutron emitters/receivers, and the like, which are used to sense characteristics of the formations adjacent the well. An armored cable, with or without electrical insulated conductors, connects the tool with surface equipment, and/or connects a plurality of tools together, for such purposes as transmitting electrical power, transmitting data, and/or providing structural support to the tools as they are moved through the wellbore. Generally, the cable is spooled out of a drum unit from a truck or an offshore set up, over a few pulleys, and down into the well. Armored cables must often have high strength to suspend the weight of the tool(s) and cable length itself.

Wireline cables are typically formed from a combination of metallic conductors, insulative material, filler materials, jackets, and armor wires. The jackets usually encase a cable core, in which the core contains metallic conductors, insulative material, filler materials, and the like. Armor wires usually surround the jackets and core. The armor wires used in wireline cables serve several purposes. They provide physical protection to the conductors in the cable core as the cable is abraded over downhole surfaces. They carry the weight of the tool string and the thousands of feet of cable hanging in the well. Two common causes of wireline cable damage are armor wire corrosion and torque imbalance. Corrosion commonly leads to weakened or broken armor wires.

Armor wire is typically constructed of cold-drawn pearlitic steel coated with zinc for corrosion protection. While zinc protects the steel at moderate temperatures, studies have shown that passivation of zinc in water (that is, loss of its corrosion-protection properties) can occur at elevated temperatures. Once the armor wire begins to rust, it loses strength and ductility quickly. Although the cable core may still be functional, it is not economically feasible to replace the armor wire, and the entire cable must be discarded. Once corrosive fluids infiltrate into the annular gaps, it is difficult or impossible to completely remove them. Even after the cable is cleaned, the corrosive fluids remain in the annular spaces damaging the cable. As a result, cable corrosion is essentially a continuous process beginning with the wireline cable's first trip into the well.

When an axial load is applied onto a cable, the helical arrangement of the armor wire causes the cable to develop a torsional load. The magnitude of this load depends on the helix arrangement and the size of the armor wires. There are two traditional ways of reducing the magnitude of torque that is developed: (1) increase the helix length substantially, or (2) use lower diameter armor wires on the outside and higher diameter on the inside. Neither of these options is very practical with wireline cable. The first approach increases the rigidity of the cable to flexure. The second approach may lead to decreased cable life due to abrasion issues. The cable also experiences reduction in the diameter due to the radial forces that develop during cable loading. This compresses the cable core and can cause insulation creep on conductors, leading to possible short circuits or broken conductors. During torsional loading of the cable, the effective break load of the cable will decrease due to a change in the load distribution over the two layers of armor wires. Also, when inner and outer wire armor layers, each having wires orientated in helix configurations, are used, this leads to torque development when the cable is placed under an axial load.

Another problem encountered with traditional armored wire cables occurs in high-pressure wells, the wireline is run through one or several lengths of piping packed with grease to seal the gas pressure in the well while allowing the wireline to travel in and out of the well. Because the armor wire layers have unfilled annular gaps, gas from the well can migrate into and travel through these gaps upward toward lower pressure. This gas tends to be held in place as the wireline travels through the grease-packed piping. As the wireline goes over the upper sheave at the top of the piping, the armor wires tend to spread apart slightly and the pressurized gas is released, where it becomes an explosion hazard.

Thus, a need exists for high strength armored wellbore electric cables that have improved corrosion resistance and torque balancing, while being efficiently manufactured. Further, a need exists for cables which help prevent or minimize gas migration from a wellbore. An electrical cable that can overcome one or more of the problems detailed above while conducting larger amounts of power with significant data signal transmission capability would be highly desirable, and the need is met at least in part by the following invention.

SUMMARY OF THE INVENTION

The invention relates to wellbore cables, and in particular, the invention relates to high strength cables formed of strength members. The cables are used with devices to analyze geologic formations adjacent a wellbore. Cables of the invention may be of any practical design, including monocables, coaxial cables, quadcables, heptacables, slickline cables, multi-line cables, etc. Cables described herein have improved corrosion resistance, torque balancing, and may also help to prevent or minimize dangerous gas migration from a wellbore to the surface.

Cables of the invention use polymer jacketed stranded filaments as strength members. Filaments are single continuous metallic wires which run the length of a cable. A plurality of filaments is bundled to form a strength member, and may include a polymer jacket encasing the filaments. The strength members may be used as a central strength member, or even layered around a central axially positioned component or strength member to form a layer of strength members. More than one layer of strength members may be formed as well.

In one embodiment, the cable is a wellbore electrical cable including a central component and an inner layer of strength members. The layer includes at least three (3) strength members, where the inner layer is disposed adjacent the central component at a lay angle. Each strength member forming the layer includes a central filament, at least three (3) filaments helically disposed adjacent the central filament, and a polymer jacket encasing the central filament and filaments disposed adjacent the central filament.

In one embodiment, the cable includes a central component, an inner layer of strength members, the layer formed of at least four (4) strength members, where the inner layer is disposed adjacent the central component at a lay angle. Each strength member includes a central filament, at least three (3) filaments helically disposed adjacent the central filament, and a polymer jacket encasing the central filament and filaments disposed adjacent the central filament. Further, at least one armor wire layer is helically served adjacent the outer peripheral surface of the strength members.

Also disclosed is a wellbore electrical cable formed of a central component, at least four (4) strength members disposed adjacent the central component, a polymer jacket disposed upon the strength members, and an armor wire layer helically served adjacent the polymer jacket.

BRIEF DESCRIPTION OF THE DRAWINGS

The invention may be understood by reference to the following description taken in conjunction with the accompanying drawings, in which:

FIG. 3 illustrated one method of embedding and shaping outer filaments disposed over a layer of polymeric material.

FIG. 4 illustrates by cross-sectional representation of the strength member itself, the preparation described in FIG. 2.

FIGS. 5A, 5B, 5C, and 5D illustrate several embodiments of stranded filament strength members useful for some cables of the invention.

FIGS. 10A through 10E illustrate a cable with torque-balanced strength members and helical insulated conductors.

FIGS. 11A, 11B, 11C and 11D illustrate by cross-section, the construction of a seismic gun cable with torque-balanced stranded wire strength members, according to the invention.

DETAILED DESCRIPTION

Figures 1A, 1B:
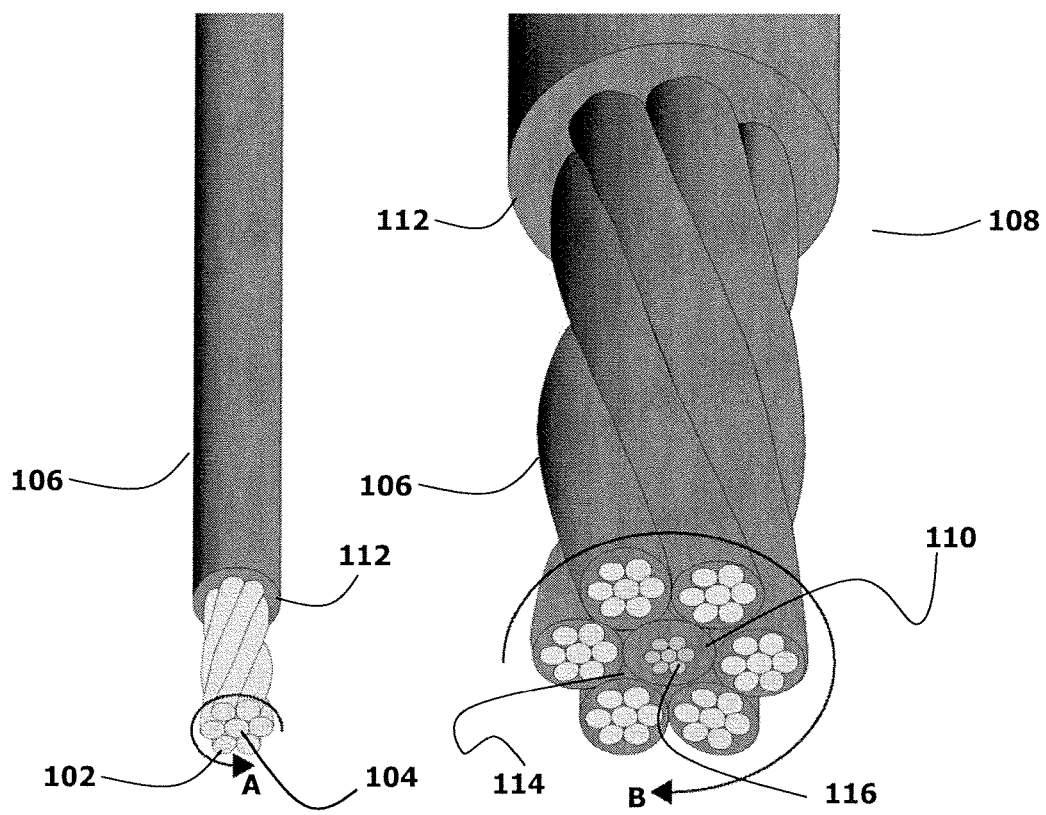
FIGS. 1A and 1B illustrate one embodiment where individual filaments are stranded together at a counter-rotational angle relative to the orientation of strength members forming cable.

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The invention relates to high strength cables including stranded wires as strength members, where the cables are dispatched into wellbores used with devices to analyze geologic formations adjacent a well. Methods of manufacturing such cables, and uses of the cables in seismic and wellbore operations are also disclosed. Cables according to the invention have improved resistance to corrosion, as well as improved torque balancing. Some cable embodiments of the invention also help prevent or minimize dangerous gas migration from a wellbore to the surface. Further, the cables of the invention may be more efficiently manufactured than traditional armored wellbore electrical cables.

Cables according to the invention utilize stranded filaments as strength members. The term "filament" as used herein means a single continuous metallic wire which runs the length of the cable in which it is used to form, and should be consider the equivalent of an armor wire unless otherwise indicated. A plurality of filaments is bundled to form a "strength member" and may include a polymer jacket encasing the filaments. The strength members may be used as a central strength member, or even layered around a central axially positioned component or strength member, to form a layer of strength members. More than one layer of strength members may be formed as well. Further, when electrically conductive filaments are used in forming the strength member, if the strength member is of high enough electrical conductance, it may be used for conducting electricity.

The metallic wires may also be bimetallic wires. When employed, such bimetallic wires have bright, drawn high strength steel wires (of appropriate carbon content and strength for wireline use) placed at the core of the wires, such as those described in U.S. patent application Ser. No. 11/153,835, filed Jun. 15, 2005 (incorporated by hereinafter by reference thereto). An alloy with resistance to corrosion is then clad over the core. The corrosion resistant alloy layer may be clad over the high strength core by extrusion or by forming over the steel wire. The corrosion resistant clad may be from about 50 microns to about 600 microns in thickness. The material used for the corrosion resistant clad may be any suitable alloy that provides sufficient corrosion resistance and abrasion resistance when used as a clad. The alloys used to form the clad may also have tribological properties adequate to improve the abrasion resistance and lubricating of interacting surfaces in relative motion, or improved corrosion resistant properties that minimize gradual wearing by chemical action, or even both properties.

While any suitable alloy may be used as a corrosion resistant alloy clad to form the armor wires according to the invention, some examples include, but are not necessarily limited to: beryllium-copper based alloys; nickel-chromium based alloys (such as Inconel® available from Reade Advanced Materials, Providence, R.I. USA 02915-0039); superaustenitic stainless steel alloys (such as 20Mo6® of Carpenter Technology Corp., Wyomissing, Pa. 19610-1339 U.S.A., INCOLOY® alloy 27-7MO and INCOLOY® alloy 25-6MO from Special Metals Corporation of New Hartford, N.Y., U.S.A., or Sandvik 13RM19 from Sandvik Materials Technology of Clarks Summit, Pa. 18411, U.S.A.); nickel-cobalt based alloys (such as MP35N from Alloy Wire International, Warwick, R.I., 02886 U.S.A.); copper-nickel-tin based alloys (such as ToughMet® available from Brush Wellman, Fairfield, N.J., USA); or, nickel-molybdenum-chromium based alloys (such as HASTELLOY® C276 from Alloy Wire International). The corrosion resistant alloy clad may also be an alloy comprising nickel in an amount from about 10% to about 60% by weight of total alloy weight, chromium in an amount from about 15% to about 30% by weight of total alloy weight, molybdenum in an amount from about 2% to about 20% by weight of total alloy weight, cobalt in an amount up to about 50% by weight of total alloy weight, as well as relatively minor amounts of other elements such as carbon, nitrogen, titanium, vanadium, or even iron. The preferred alloys are nickel-chromium based alloys, and nickel-cobalt based alloys.

Some cables according to the invention comprise a plurality of bimetallic wires bundled together to form the cable. A bimetallic wire includes a high strength core, surrounded by a corrosion resistant outer alloy clad. An optional bonding layer may be placed between the core and alloy clad. The core may be generally made of any high tensile strength material such as, by non-limiting example, steel. Examples of suitable steels which may be used as core strength members include, but are not necessarily limited to AISI (American Iron and Steel Institute) 1070, AISI 1086, or AISI 1095 steel grades, tire cords, any high strength steel wires with strength greater than 2900 mPa, and the like. The core strength member can include steel core for high strength, or even plated or coated wires. When used, the bonding layer may be any material useful in promoting a strong bond between the high strength core and corrosion resistant alloy clad. Preferably, when used, a layer of brass may be applied through a hot-dip or electrolytic deposition process to form the bonding layer.

Bimetallic wires may be bundled together used as an element in an armor wire layer or plurality of layers in any of the electrical cables according to the invention, or grouped together to form a bundle of bimetallic wires. When bundled together, the bundle of bimetallic wires may be useful as a slickline cable where electrical and data conductivity is optional, or not critical. While the bundle of bimetallic wires may be of any suitable diameter, as a slickline, the preferred diameter is from about 1 mm to about 10 mm, more preferably from about 1 mm to about 6 mm. Cables based upon bundles of bimetallic wires may have the advantages of increased strength, reduced stretching, and improved corrosion resistance.

As illustrated in FIGS. 1A and 1B, which illustrates one embodiment of cables according to the invention, individual filaments 102 (only one indicated) may be helically stranded (bundled) together around a central filament 104 at rotational direction A to form strength member 106. The direction A is at a counter-rotational direction relative to the rotational orientation B in FIG. 1B for the plurality of helically bundled strength members 106 (only one indicated) forming cable 108, as the strength members are layered over central component 110 of the cable 108. Cable 108 further includes a jacket 112 containing the plurality of strength members 106 and central component 110, as well as a polymer jacket 112 encasing the filaments 102 104 of strength member 106. The lay angles of the filaments 104 in the stranded filament strength members 106, and the lay angles of the strength members 106 as bundled to form cable 108 can be adjusted for optimal torque balance. The polymeric materials used to form the jacket 112 encasing the filaments 102 104 and the plurality of strength members 106 (only one indicated in FIG. 1B) can be continuously bonded to hold the members in place. The polymer may be amended with short fibers to provide such benefits as added strength or abrasion resistance. A final, fiber-less polymer layer may be included to provide an optimal sealing surface which may also be tear and rip resistance.

Referring to FIG. 1B, annular gaps 114 (only one shown) formed between filaments 102 104, strength members 106, and conductor 110 in cables of the invention may be filled with polymeric materials, to minimize of prevent infiltration, accumulation, and/or transportation of downhole fluids and gases. The polymer jackets 112 may also serve as a filter or trap for many corrosive fluids. By minimizing the strength members 106 exposure to these materials and preventing accumulation of corrosive fluids in the annular gaps 114, it is believed the filaments' 102 104, and the cable's, useful life is significantly improved.

While the embodiments of the invention are not bound to any particular theory or mechanism of operation, the following may illustrate the torque balancing of some cables of the invention. Each stranded filament strength member has a given torque value (Twri) before cabling at tension T (all torques are given a reference tension). Summing the values for all of the strength members of a given type gives the total torque value (Tc). The lay angles used for individual filaments in the strength members, and in cabling the completed strength members over the cable core can be adjusted to provide optimum torque balance, as explained by the following expressions:

$T_{wri}$=Torque for one stranded wire strength member before cabling $T_{wriT}$=$\Sigma T_{wri}$ $T_{wriC}$=Torque (counter to $T_{wri}$) created by cabling one stranded wire strength member over cable core $T_{wriCT}$=$\Sigma T_{wriC}$ $T_{wriT}$=$T_{wriCT}$ Cabling the strength members over the cable's central component at a counter-rotation relative to that of the individual outer filaments in the strength members creates slickline and multi-line sized cables that can withstand higher work loads (i.e. 500 kgf to 2000 kgf). In such configurations, the central component 110 shown in FIG. 1B may be of a similar or like arrangement as component 106 where electrical and/or data conductivity is not critical or necessary.

The armored wellbore electrical cables according to the invention generally include a central component, and at least three (3) strength members disposed adjacent the central component. Each strength member comprises a central filament, at least three (3) filaments helically disposed adjacent the central filament, and a polymer jacket encasing the central filament and filaments disposed adjacent the central filament. The central component may be an insulated conductor, conductor, or a strength member. The central component may be of such construction so as to form a monocable, slickline, multi-line, heptacable, seismic, quadcable, or even a coaxial cable. The strength members are preferably helically disposed around the central component. The polymer jacket is preferably amended, at least in part, with a fiber reinforcing material.

Cables according to the invention may use any suitable materials to form filaments which are high strength, and provide such benefits as corrosion resistance, low friction, low abrading, and high fatigue threshold. Non-limiting examples of such materials include steel, steel with a carbon content in the range from about 0.6% by weight to about 1% by weight, any high strength steel wires with strength greater than 2900 mPa, and the like. Using tire cords to manufacture the strength members enables lower lay angles to be used, which may result in cables with higher working strengths. Also, as described hereinabove, the filaments may be formed of a combination of materials, such as materials used to form a bimetallic wire. The filament materials may also be a high strength organic material, such as, but not limited to, long continuous fiber reinforced composite materials, formed from a polymer such as PEEK, PEK, PP, PPS, fluoropolymers, thermoplastics, thermoplastic elastomers, thermoset polymers, and the like, and the continuous fibers may be carbon, glass, quartz, or any suitable synthetic material.

As described hereinabove, cables of the invention may include jacketed stranded filaments. Also, the interstitial spaces formed between strength members (stranded filaments), and between strength members and central component, may be filled with a polymeric material. Polymeric materials are used to form the polymer jackets and fill the interstices may be any suitable polymeric material. Suitable examples include, but are not necessarily limited to, polyolefin (such as EPC or polypropylene), other polyolefins, polyamide, polyurethane, thermoplastic polyurethane, polyaryletherether ketone (PEEK), polyaryl ether ketone (PEK), polyphenylene sulfide (PPS), modified polyphenylene sulfide, polymers of ethylene-tetrafluoroethylene (ETFE), polymers of poly(1,4-phenylene), polytetrafluoroethylene (PTFE), perfluoroalkoxy (PFA) polymers, fluorinated ethylene propylene (FEP) polymers, polytetrafluoroethylene-perfluoromethylvinylether (MFA) polymers, Parmax®, ethylene chloro-trifluoroethylene (such as Halar®), chlorinated ethylene propylene, and any mixtures thereof. Preferred polymeric materials are ethylene-tetrafluoroethylene polymers, perfluoroalkoxy polymers, fluorinated ethylene propylene polymers, and polytetrafluoroethylene-perfluoromethylvinylether polymers.

The polymeric material may be disposed contiguously from the center of the cable to the outermost layer of armor wires, or may even extend beyond the outer periphery thus forming a polymer jacket that completely encases the armor wires. By "contiguously disposed" it is meant the polymeric material is touching or connected throughout the cable in an unbroken fashion to form a matrix which encases and isolates other cable components, such as the central component and strength members' filaments. Referring again to FIGS. 1A and 1B, an example of such a contiguous matrix encasing and isolating other cable components is represented by polymer jackets 112 as well as filling the interstitial spaces 114 with a polymeric material. In some cases, when different polymeric materials are used, the materials forming the polymer jackets may be chemically and/or mechanically bonding with one another as well. In some embodiments, the polymeric material may be chemically and/or mechanically bonded contiguously from the innermost layer to the outermost layer. Put another way, the polymeric materials may be bonded continuously from the center of the cable to its periphery, forming a smooth jacket that is rip resistant. Short carbon fibers, glass fibers, or other synthetic fibers may be added to the jacket materials to reinforce the thermoplastic or thermoplastic elastomer and provide protection against cut-through. In addition, graphite, ceramic or other particles may be added to the polymer matrix to increase abrasion resistance.

Cables of the invention may include metallic conductors, and in some instances, one or more optical fibers. Referring to FIG. 1, conductors and optical fiber, when used, are typically contained within the central component of the cable, as shown by conductors 116 (only one indicated). Also, conductors and optical fiber may be placed in other areas of the cable, including the interstices 114. Any suitable metallic conductors may be used. Examples of metallic conductors include, but are not necessarily limited to, copper, nickel coated copper, or aluminum. Preferred metallic conductors are copper conductors. While any suitable number of metallic conductors may be used in forming the central component 110, preferably from 1 to about 60 metallic conductors are used, more preferably 1, 7, 19, or 37 metallic conductors. In FIG. 1, central component 110 shown contains seven (7) conductors 116 to form a monocable.

Any commercially available optical fibers may be used. The optical fibers may be single-mode fibers or multi-mode fibers, which are either hermetically coated or uncoated. When hermetically coated, a carbon or metallic coating is typically applied over the optical fibers. An optical fiber may be placed in any location in a standard wireline cable core configuration. Optical fibers may be placed centrally (axially) or helically in the cable. One or more further coatings, such as, but not limited to, acrylic coatings, silicon coatings, silicon/PFA coatings, silicon/PFA/silicone coatings or polyimide coatings, may be applied to the optical fiber. Coated optical fibers which are commercially available may be given another coating of a soft polymeric material such as silicone, EPDM, and the like, to allow embedment of any metallic conductors served around the optical fibers. Such a coating may allow the space between the optical fiber and metallic conductors to be completely filled, as well as reducing attenuation of optical fiber's data transmission capability.

A protective polymer coating may be applied to each filament for corrosion protection. Non-limiting examples of coatings include: fluoropolymer coatings such as FEP, Tefzel®, PFA, PTFE, MFA; PEEK or PEK with fluoropolymer combination; PPS and PTFE combination; latex coatings; or rubber coatings. Filaments may also be plated with about a 0.5-mil to about a 3-mil metallic coating, which may enhance bonding of the filaments to the polymer jacket materials. The plating materials may include such materials as ToughMet® (a high-strength, copper-nickel-tin alloy manufactured by Brush Wellman), brass, copper, copper alloys, and the like.

The polymer jacket material and filament coating material may be selected so that the filaments are not bonded to and can move within the jacket. In such scenarios, the jacket materials may include polyolefins (such as EPC or polypropylene), fluoropolymers (such as Tefzel®, PFA, or MFA), PEEK or PEK, Parmax, or even PPS.

In some instances, virgin polymers forming the jackets don't have sufficient mechanical properties to withstand 25,000 lbs of pull or compressive forces as the cable is pulled over sheaves, so the polymeric material may be amended with short fibers. The fibers may be carbon, fiberglass, ceramic, Kevlar®, Vectran®, quartz, nanocarbon, or any other suitable synthetic material. As the friction for polymers amended with short fibers may be significantly higher than that of virgin polymer, to provide lower friction, a 1- to 15-mil layer of virgin material may be added over the outside of the fiber-amended jacket.

Particles may be added to polymeric materials forming the jackets to improve wear resistance and other mechanical properties. This may be done be in the form of a 1- to 15-mil layer applied on the outside of the jacket or throughout the jacket's polymer matrix. The particles may include Ceramer™, boron nitride, PTFE, graphite, or any combination thereof. As an alternative to Ceramer™, fluoropolymers or other polymers may be reinforced with nanoparticles to improve wear resistance and other mechanical properties. This can be in the form of about a 1 to about a 10-mil jacket applied on the outside of the jacket or throughout the jacket's polymer matrix. Nanoparticles may include nanoclays, nanosilica, nanocarbon bundles, nanocarbon fibers, or any other suitable nano-materials.

Soft polymers (with a hardness range less than 50 ShoreA) can be extruded over the central filament in the strength members used in this invention. Suitable materials include, but are not limited to, Santoprene, or any other polymer softened by the addition of suitable plasticizers.

Filler rods may be placed in the interstices formed between the strength members, and strength members and central component of cables according to the invention. Further, some filler rods include a compression-resistant rod and a compression-resistant polymer encasing the rod. The filler rods may be formed of several tightly twisted synthetic yarns, or monofilaments. Materials used to prepare the compression-resistant filler rods include, but are not necessarily limited to tetrafluoroethylene (TFE), polyphenylene sulfide (PPS), polyetheretherketone (PEEK), polyetherketone (PEK), fluoropolymers, and synthetic fibers, such as polyester, polyamides, Kevlar®, Vectran®, glass fiber, carbon fiber, quartz fiber, and the like. Examples of compression-resistant polymers used to encase the filler rod include, by nonlimiting example, Tefzel, MFA, perfluoroalkoxy resin (PFA), fluorinated ethylene propylene (FEP), polyphenylene sulfide (PPS), polyetheretherketone (PEEK), polyolefins (such as [EPC] or polypropylene [PP]), carbon-fiber reinforced fluoropolymers, and the like. These filler rods may also minimize damage to optical fibers since the cable may better maintain geometry when high tension is applied.

The materials forming the jacket materials used in the cables according to the invention may further include a fluoropolymer additive, or fluoropolymer additives, in the material admixture to form the cable. Such additive(s) may be useful to produce long cable lengths of high quality at high manufacturing speeds. Suitable fluoropolymer additives include, but are not necessarily limited to, polytetrafluoroethylene, perfluoroalkoxy polymer, ethylene tetrafluoroethylene copolymer, fluorinated ethylene propylene, perfluorinated poly(ethylene-propylene), and any mixture thereof. The fluoropolymers may also be copolymers of tetrafluoroethylene and ethylene and optionally a third comonomer, copolymers of tetrafluoroethylene and vinylidene fluoride and optionally a third comonomer, copolymers of chlorotrifluoroethylene and ethylene and optionally a third comonomer, copolymers of hexafluoropropylene and ethylene and optionally third comonomer, and copolymers of hexafluoropropylene and vinylidene fluoride and optionally a third comonomer. The fluoropolymer additive should have a melting peak temperature below the extrusion processing temperature, and preferably in the range from about 200° C. to about 350° C. To prepare the admixture, the fluoropolymer additive is mixed with the polymeric material. The fluoropolymer additive may be incorporated into the admixture in the amount of about 5% or less by weight based upon total weight of admixture, preferably about 1% by weight based or less based upon total weight of admixture, more preferably about 0.75% or less based upon total weight of admixture.

Components used in cables according to the invention may be positioned at zero lay angle or any suitable lay angle relative to the center axis of the cable. Generally, the central component is positioned at zero lay angle, while strength members surrounding the central insulated conductor are helically positioned around the central component at desired lay angles.

Cables according to the invention may be of any practical design, including monocables, coaxial cables, quadcables, heptacables, slickline cables, multi-line cables, support cables, and the like. In coaxial cable designs of the invention, a plurality of metallic conductors are disposed adjacent the outer periphery of the central component. Also, for any cables of the invention, the insulated conductors may further be encased in a tape. All materials, including the tape disposed around the insulated conductors, may be selected so that they will bond chemically and/or mechanically with each other. Cables of the invention may have an outer diameter from about 1 mm to about 125 mm, and preferably, a diameter from about 2 mm to about 20 mm.

Figure 2:
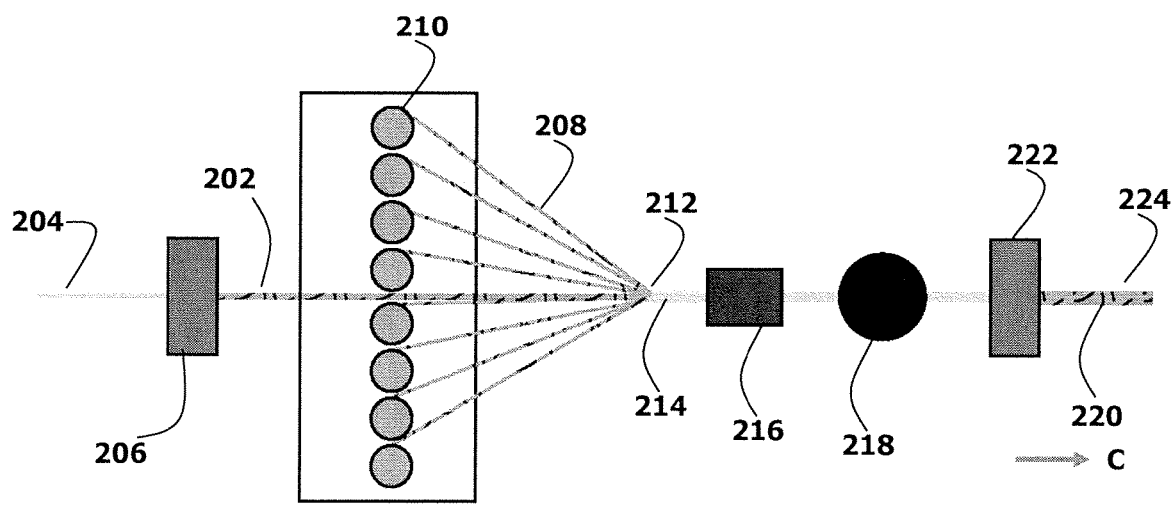
FIG. 2 represents a process for forming strength members with interstitial spaces filled with a polymeric material, and ability to bond the strength member with the cable's polymer jacket.

In some embodiments of the invention, the strength members are manufactured with interstitial spaces formed between individual filaments filled with a polymeric material, and while enabling the strength members to be bonded with the cable's polymer jacket. This is illustrated below in FIGS. 2, 3, and 4. FIG. 2 illustrates a process for forming strength members with interstitial spaces filled with a polymeric material, and ability to bond the strength member with the cable's polymer jacket. In FIG. 2, a polymeric material 202 is compression-extruded over a central filament 204 in extruder 206. Polymeric material 202 may be non-fiber-reinforced polymer, short-fiber-reinforced polymer, formed polymer, or a soft polymer. Outer filaments 208 (only one indicated) are delivered from spools 210 and cabled over polymeric material 202 at a suitable lay angle, at process point 212 to form strength member 214. In one embodiment, if a short-fiber reinforced polymer is used as polymeric material 202, the strength member 214 may then pass through a heat source 216 (such as an electromagnetic heat source) that heats the polymeric material 202 adequately so that the outer filaments 208 become partially embedded into polymeric material 202. If a soft polymer or formed polymer is used as the polymeric material 202, the heat source 216 may not be necessary. The strength member 214 may pass through a series of rollers 218, and as represented in FIG. 3, which serves to further embed the outer filament into the polymeric material 202 and maintain a consistent cross-sectional profile. An outer polymer jacket 220, which may be short-fiber-reinforced, may then be compression-extruded over the outer filaments 208 to complete the strength member 224. The polymer jacket eliminates interstitial spaces between the wires and allows the strength members to be bonded in place when cabled onto the armored cables.

In some embodiments, the strength member 214 could have, at most, two layers of filaments surrounding the central filament 204, each layer with nine or less outer filaments 208. These layers could be applied by repeating the process described in FIG. 2. A polymeric material 202 would be disposed over each layer of filaments.

Referring now to FIG. 3, one technique as described above in FIG. 2, which utilizes two series of adjustable rollers, 302 and 304 offset by about a 90 degree angle. As shown in FIG. 3, precisely sized grooves 306 in the rollers press the cabled outer filaments 208 evenly into the polymeric material 202, resulting in firmly contacted and embedded outer filaments 208 as the strength member moves in direction C. FIG. 4 further illustrates by cross-sectional representation of the strength member itself, the preparation described in FIG. 2 above. In FIG. 4, polymeric material 202 is compression-extruded over a central filament 204. Then, outer filaments 208 (only one indicated) are cabled over polymeric material 202. Outer filaments 208 are then embedded in polymeric material 202. An outer polymer jacket 220 may then be extruded over the outer filaments 208 to complete the strength member 224.

FIGS. 5A, 5B, 5C, and 5D illustrate several embodiments of stranded filament strength members useful for some cables of the invention. In FIG. 5A, a soft or formed polymer 502 may be disposed over the central filament 504 of the strength member. The soft or formed polymer 502 fills interstitial spaces formed between outer filaments 506 (only one indicated) and central filament 504, and a polymer jacket 508 (which may be short-fiber-reinforced) is placed adjacent the outer filaments 506. Also, no heating is required in forming strength member 510. In FIG. 5B, the design is nearly the same as that in FIG. 5A, except interstitial spaces 512 formed between outer filaments 506 and central filament 504 are not filled to form the strength member 514. The strength member 522 in FIG. 5C, uses a short-fiber-reinforced polymeric material 524 placed completely and contiguously over the central filament 504 and isolates the filament 504 from outer filaments 506. FIG. 5D a stranded wire strength member 532 with no polymer jacketing, composed only of outer filaments 506 and central filament 504.

Figure 6:
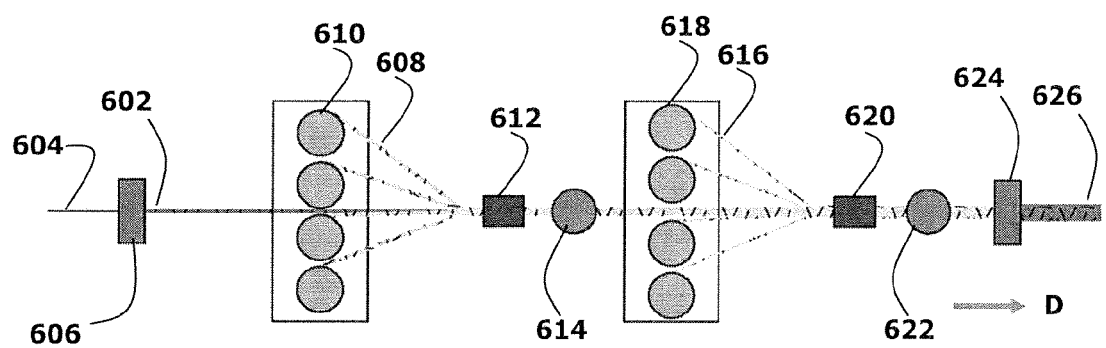
FIG. 6 illustrates preparation of cables containing torque-balanced stranded wire strength members.

FIGS. 6 and 7A-7F illustrate some cable embodiments, and preparation of those cables, of the invention which are monocables with torque-balanced stranded wire strength members. In FIG. 6, a fiber-reinforced polymer jacket 602 is compression-extruded with extruder 606 over a central component 604 which is a monocable conductor, such as central component 110 in FIG. 1B. Stranded filament strength members 608 (only one indicated) are cabled from spools 610 (only one indicated) over the polymer jacket 602 at suitable lay angles. This lay angle may be counter to the angle used for the filaments in the strength members 608 (that is, if the outer wires were cabled clockwise onto the strength members, the completed strength members are cabled counter-clockwise onto the cable). Next, the cable comprising strength members 608 and polymer jacketed 602 central component 604, traveling in direction D, passes through an electromagnetic heat source 612. The heat slightly melts the fiber-reinforced jacket 602 on the cable central component 604 and the strength members 608, allowing the strength members 608 to become at least partially embedded into the cable central component's 604 polymer jacket 602. The cable then passes through a series of rollers 614 to further embed the strength members 608 and maintain a consistent cross-sectional profile. As an option, filler rods 616 (only one indicated), optionally coated in fiber-reinforced polymer, or other suitable filler materials, may be applied from spools 618 (only one indicated) into the grooves between the outer surfaces of the strength members 608. Passing through a second heat source 620 would enable the fillers 616 to at least partially seat into the polymer of jacket 602. A second series of rollers 622 could further embed the filler rods 616 into place and maintain the cable's profile. An outer fiber-reinforced polymer jacket may then be compression extruded from extruder 624 over the strength members 608 and optional filler rods 616 to form monocable 626.

Figures 7A, 7B, 7C:
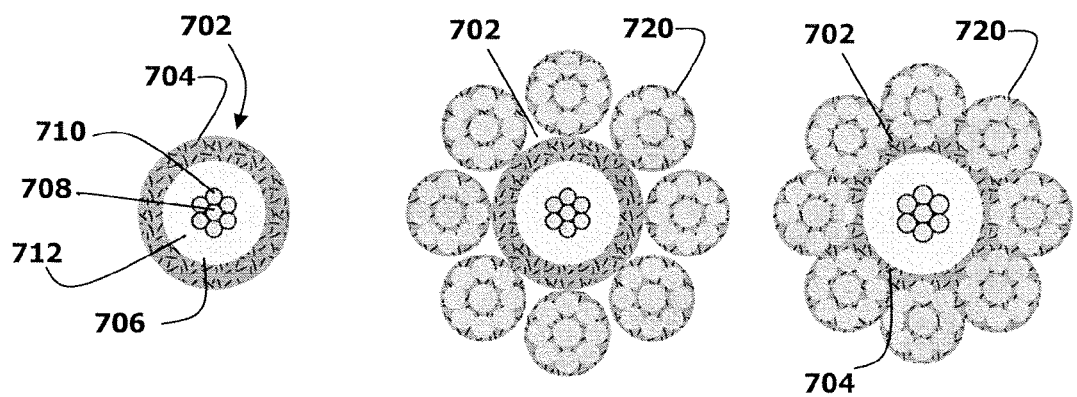
FIGS. 7A through 7F show by cross-section, the steps in preparing the monocable described above in FIG. 6.
Figures 7D, 7E, 7F:
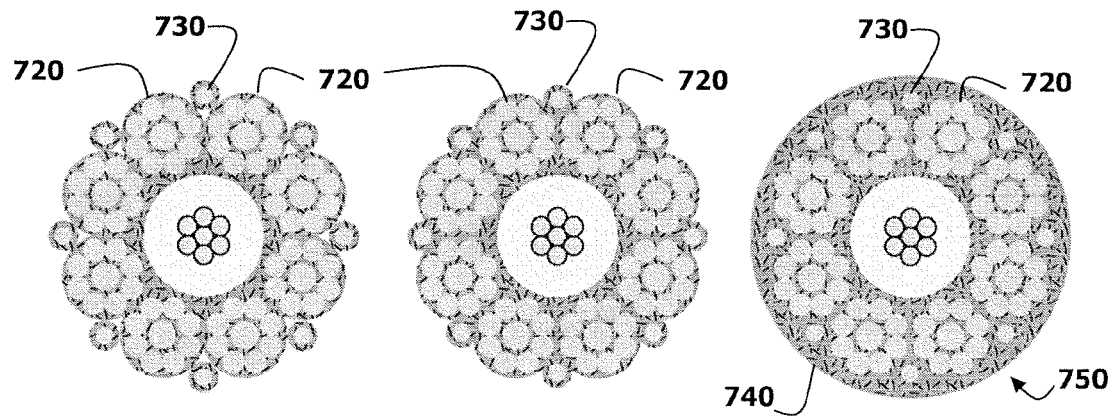

FIGS. 7A through 7F show by cross-section, the steps used to prepare the monocable with torque-balanced strength members described above in FIG. 6. In FIG. 7A, a jacketed monocable conductor 702 is shown in cross-section, which includes an outer polymer jacket 704 encasing a monocable insulated conductor 706. Conductor 706 includes a central metallic conductor 708 with six outer metallic conductors 710 (only one shown) helically served over the central conductor 708. An electrically insulating polymeric material 712 is the disposed adjacent the outer conductors 710. In FIG. 7B, a plurality of strength members 720 (eight in this case, but only one indicated), which are similar to or the same as the strength member 224 shown in FIG. 4, are helically disposed in a first layer, or inner layer, adjacent to monocable conductor 702. In FIG. 7C, strength members 720 are embedded into the outer polymer jacket 704 of monocable conductor 702. FIG. 7D shows how optional filler rods 730 (only one indicated) may be disposed adjacent and in contact with two strength members 720. In FIG. 7E filler rods 730 are embedded into the polymer jacket of two strength members 720. FIG. 7F shows that a fiber-reinforced polymer jacket 740 may be compression extruded over the strength members 720 and filler rods 730 to form monocable 750.

Figure 8A:
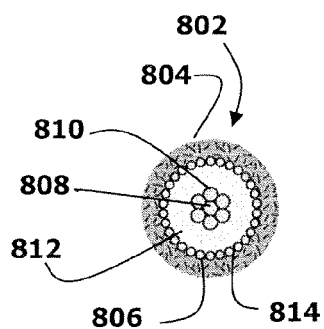
FIGS. 8A through 8F show by cross-section, a coaxial cable according to the invention.
Figure 8B:
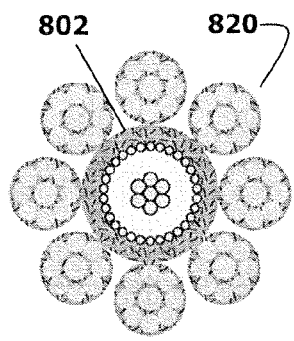
Figure 8C:
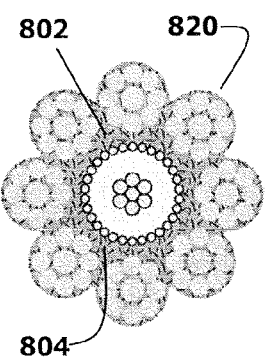
Figure 8D:
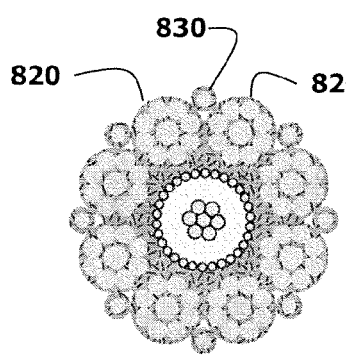
Figure 8E:
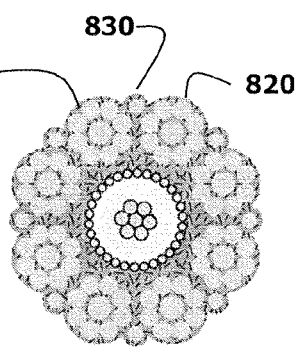
Figure 8F:
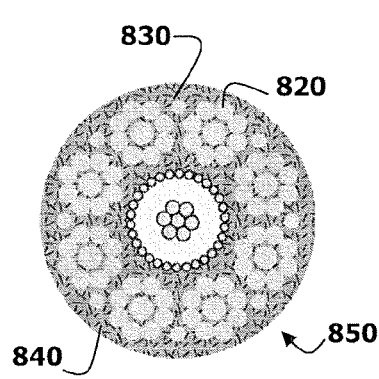

FIGS. 8A through 8F show by across-section, a coaxial cable with torque-balanced strength members according to the invention, prepared by techniques described in FIG. 6. In FIG. 8A, a jacketed monocable conductor 802 is shown in cross-section, which includes an outer polymer jacket 804 encasing a coaxial insulated conductor 806. Conductor 806 includes a central metallic conductor 808 with six outer metallic conductors 810 (only one shown) helically served over the central conductor 808. An electrically insulating polymeric material 812 is disposed adjacent the outer conductors 810, and metallic conductors 814 are disposed upon the periphery of the electrically insulating polymeric material 812, to form the coaxial conductor. In FIG. 8B, a plurality of strength members 820 (only one indicated), are helically disposed in a first layer, or inner layer, adjacent to conductor 802. In FIG. 8C, strength members 820 are embedded into the outer polymer jacket 804 of conductor 802. FIG. 8D shows filler rods 830 (only one indicated) disposed adjacent and in contact with two strength members 820. In FIG. 8E filler rods 830 are embedded into the polymer jacket of two strength members 820. FIG. 8F shows that a fiber-reinforced polymer jacket 840 may be compression extruded over the strength members 820 and filler rods 830 to form coaxial able 850.

Figure 9A:
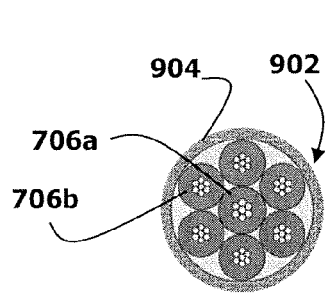
FIGS. 9A through 9F illustrate by cross-section a heptacable embodiment with torque-balanced stranded filament strength members, according to the invention.
Figure 9B:
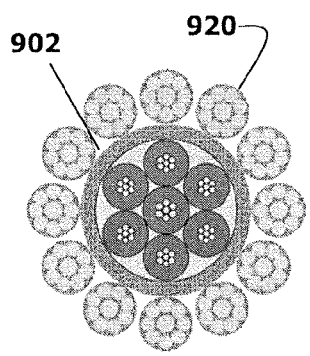
Figure 9C:
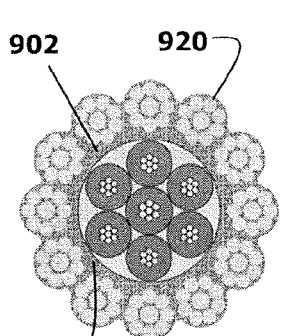
Figure 9D:
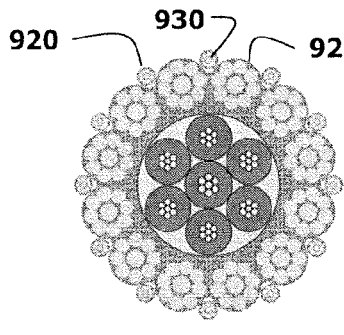
Figure 9E:
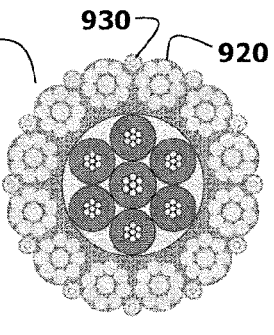
Figure 9F:
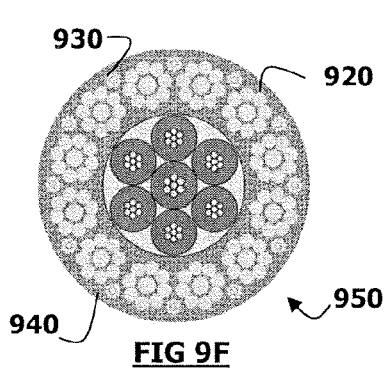

FIGS. 9A through 9F illustrate a heptacable embodiment with torque-balanced stranded filament strength members, according to the invention. In FIG. 9A, a fiber-reinforced polymer jacket 904 is compression-extruded over a standard heptacable conductor 906 which serves as the cables central component 902. The heptacable conductor 906 is essentially a bundle of seven monocable insulated conductors 706 shown in FIG. 7, with one conductor 706a placed on the central axis, and six conductors 706b (only one indicated) helically disposed upon central conductor 706b. Strength members 920 (only one indicated) are cabled in a first layer, or inner layer, over the central component 902 at a lay angle. Next, the cable passes through an electromagnetic heat source. The heat slightly melts the fiber-reinforced jacket 904 on the cable central component 902 and the strength members 920, allowing the strength members 920 to become partially embedded into the cable core jacket 904, and the cable passes through a series of rollers to further embed the strength members and maintain a consistent profile, as shown in FIG. 9C. As an option, as shown in FIG. 9D, smaller strength members or single filaments coated in fiber-reinforced polymer, 930 (only one indicated), may be cabled into the grooves between the outer surfaces of the strength members 920. Passing through a second heat source, as shown in FIG. 9E, could allow the individual smaller strength members or single filaments 930 to become seated into the polymer, and a second series of rollers could further embed and maintain the cable's profile. In FIG. 9F, an outer, fiber-reinforced polymer jacket 940 may then be compression extruded over the outer periphery of smaller strength members or single filaments 930 and strength members 920.

FIGS. 10A through 10E illustrate yet another embodiment of the invention, which is a cable with torque-balanced strength members and helical insulated conductors. As shown in FIG. 10A, an outer fiber-reinforced polymer jacket 1002 is compression-extruded over a central strength member 224a, such as 224 described in FIG. 4 and hereinabove, to form central component 1004. Additional strength members 224b (only one indicated) are then cabled over the central component 1004 at a lay angle in a first layer, or inner layer. This lay angle will be counter to the angle used for the outer filaments 208 (refer to FIG. 4) forming the strength members (that is, if the outer wires were cabled clockwise onto the strength members, the strength members are cabled counter-clockwise onto the cable). Next, the cable passes through a heat source. The heat slightly melts the fiber-reinforced jackets on the central 1004 and helical strength members 224b, allowing the helical strength members 224b to become partially embedded into the jacket 1002 on the central strength member 1004 (as shown in FIG. 10C). The cable passes through a series of rollers to further embed the strength members 224b into jacket 1002 to maintain a consistent profile. Referring now to FIG. 10D, small, insulated conductors 1006 are helically cabled over the surfaces of outer strength members 224b in the exposed outer peripheral interstitial spaces between the strength members 224b. The conductors 1006 are sized such that they do not protrude beyond the outer profile, as represented by circumference E of the totality of strength members 224b. Now referring to FIG. 10E, an outer, fiber-reinforced polymer jacket 1008 is compression extruded over the strength members 224b and conductors 1006 to form cable 1010.

FIGS. 11A, 11B, 11C and 11D illustrate by cross-section, the construction of a seismic gun cable with torque-balanced stranded wire strength members, according to the invention. In FIG. 11A, a polymer jacket 1102, which may be fiber-reinforced, is compression-extruded over a cable central component 1104 which may be any seismic gun cable core known or readily apparent to those with skill in the art. Strength members 1106 (only one shown) are cabled over the jacket 1102 and component 1104, as shown in FIG. 11B. Next, the cable passes through a heat source, and heat slightly melts the jackets encasing the cable central component 1102 and the strength members, allowing the strength members 1106 to become partially embedded into the jacket 1102 (see FIG. 11C). The cable may then cable passes through a series of rollers to further embed the strength member 1106 and maintain a consistent profile. As shown in FIG. 11D, an outer, fiber-reinforced polymer jacket 1108 is compression extruded over the strength members 1106 to form seismic cable 1110.

Figure 12:
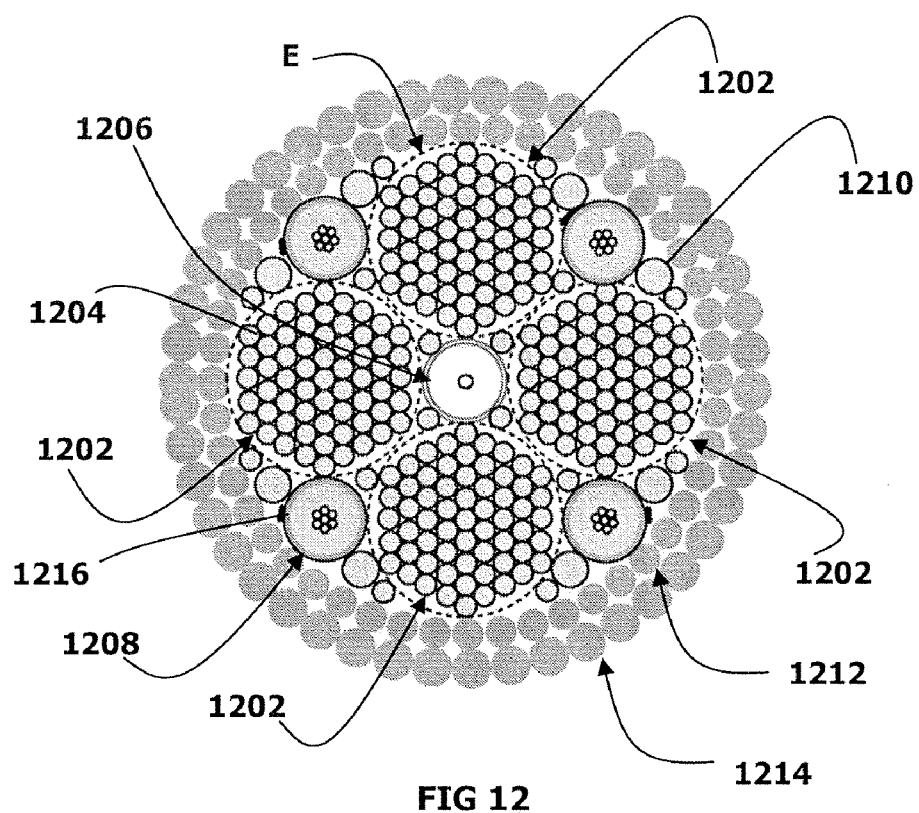
FIG. 12 illustrates in cross-sectional view, a cable is assembled using strength members and individual conductors in accordance with the invention.

FIG. 12 illustrates yet another cable embodiment according to the invention. In FIG. 12, the cable is assembled from strength members and individual conductors. Four strength members 1202, each containing a plurality of filaments 1204 (only one indicated) are cabled around a central conductor 1206. The dashed circles F (only one indicated) represent effective circumferences of strength members 1202. Four outer insulated conductors 1208 (only one indicated) are placed in the spaces between the outsides of the strength members 1202. Individual armor wires 1210 (only one indicated) of any suitable size are used throughout the cable as interstitial filler. The outer conductors 1208 may be contained within metallic wrappers 1216. The central conductor 1206 may a fiber optic element contained within a stainless steel tube or serve of wires, for example. Optionally, one or more conductors 1208 placed in metallic wrappers may be placed at the center of the cable as the conductor 1206. At least one layer, in this embodiment two layers, of served armor wires, 1212 and 1214, are placed around the outside of this high-strength cable core cable. Optionally, polymer filler may be placed throughout the high-strength cable core to fill any interstitial voids.

Figure 13:
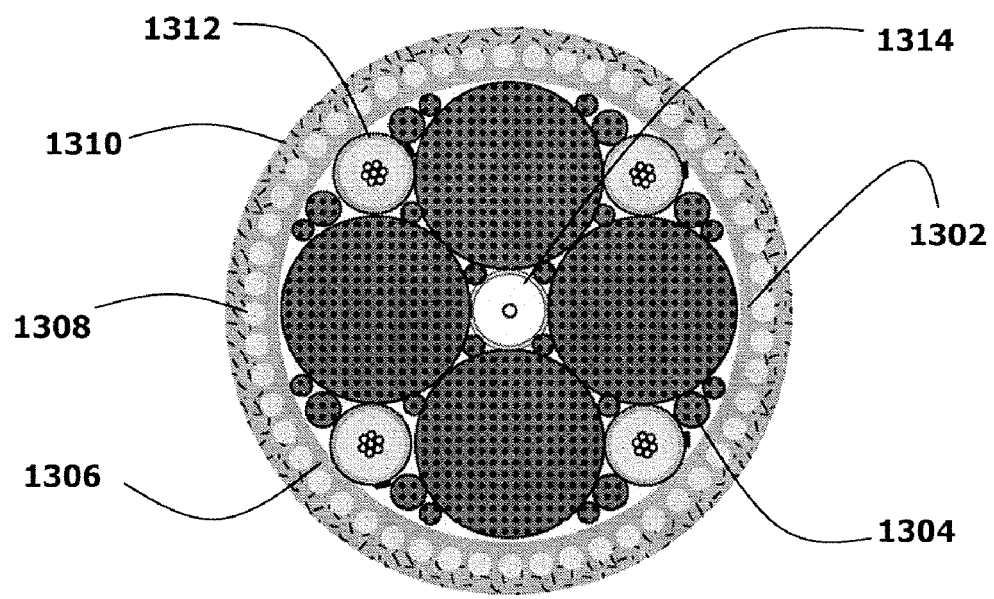
FIG. 13 shows by cross-section a cable embodiment using long continuous fiber polymer composite materials as strength members.

FIG. 13 illustrates even another cable embodiment according to the invention. In this case, long continuous fiber polymer composite materials 1302 (only one indicated) are used in the core of the cable as strength members. The polymeric materials may be disposed throughout the cable core in other varied diameters 1304 (only one indicated). A polymer jacket 1306 is extruded over high-strength core containing polymer composite materials 1302 and 1304. A layer of small armor wires 1308 is cabled helically around the inner jacket 1306 to hold the components in place. An outer jacket layer 1310 of the same polymeric material as the inner jacket 1306 is placed over the armor wires 1308. Because they are made of the same material, the inner 1306 and outer 1310 jackets may bond through the spaces between the armor wires 1308. The outer jacket 1310 may be further reinforced with graphite or short synthetic fibers for abrasion and cut-through resistance. The high strength core may contain insulated conductors 1312 (only one indicated) or optical fiber contained in a tube or serve of wires 1314.

The numbers and sizes of conductors and strength members may vary depending on specific design requirements in any of the cables of the invention. For example, if 12 to 18-AWG wire is used, four conductors 1312 could be used as shown in FIG. 13. However, if 8 to 11-AWG wire is used, then perhaps two conductors could be used 1312.

Figure 14:
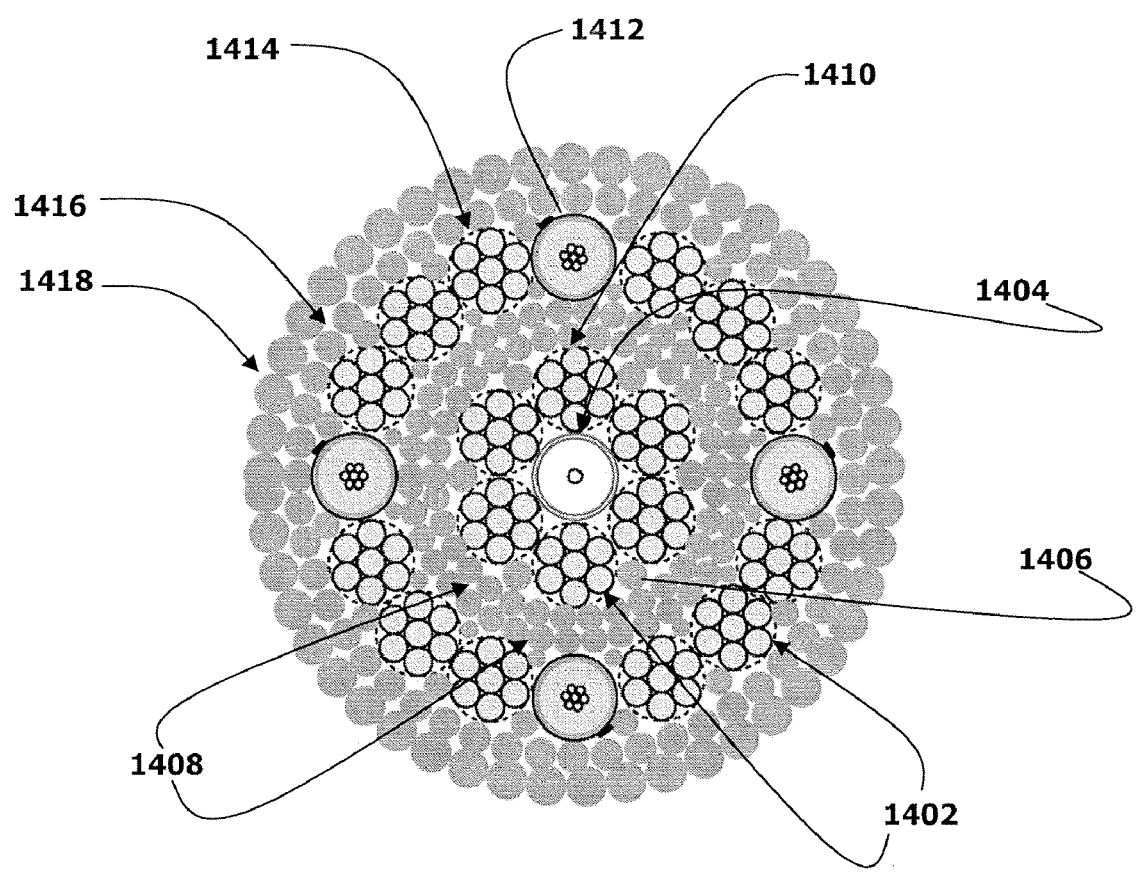
FIG. 14 illustrates by cross-section a cable using small strength members disposed adjacent a central conductor, thus forming a central component of the cable.

FIG. 14 illustrates by cross-section, another embodiment of the invention, using small strength members disposed adjacent a central conductor, the combination forming a central component of the cable. The strength members 1402

(only two indicated) lock against one another, providing compression or collapse resistance to the central conductor 1404. This central conductor 1404 may be a fiber optic element or a compression-resistant, metal-wrapped conductor, as described hereinabove. Individual armor wires 1406 (only one indicated) may be used as interstitial filler between the strength members 1402. As an option, the strength members 1402 may be laid straight and loosely wrapped with a tape to hold them in place during construction. Because this tape serves only a temporary purpose, it may not need to overlap. Two or more layers 1408 of served armor wires may be wrapped around an inner layer 1410 of strength members 1402. Insulated conductors 1412 (only one indicated) may be spaced evenly distributed within an outer layer 1414 of strength members 1402. Additional layers of served armor wires 1416 and 1418 are placed over the layer 1414 comprising outer conductors 1412 and strength members 1402.

In accordance with the invention, torque balanced cables may also be achieved using an inner and outer layers of stranded wire strength members. For example, a cable could have an outer layer of strength members disposed adjacent an inner layer of strength members, where the outer layer is formed from at least four (4) outer strength members. The strength members forming the outer layer may be orientated at a lay angle opposite to the lay angle of the strength members forming the inner layer of strength members.

Cables may include armor wires employed as electrical current return wires which provide paths to ground for downhole equipment or tools. The invention enables the use of armor wires for current return while minimizing electric shock hazard. In some embodiments, the polymeric material isolates at least one armor wire in the first layer of armor wires thus enabling their use as electric current return wires.

Cables according to the invention may be used with wellbore devices to perform operations in wellbores penetrating geologic formations that may contain gas and oil reservoirs. The cables may be used to interconnect well logging tools, such as gamma-ray emitters/receivers, caliper devices, resistivity-measuring devices, seismic devices, neutron emitters/receivers, and the like, to one or more power supplies and data logging equipment outside the well. Cables of the invention may also be used in seismic operations, including subsea and subterranean seismic operations. The cables may also be useful as permanent monitoring cables for wellbores. Additionally, the cable may be used as strength members for performing wellbore mechanical service operations, such as, but not necessarily limited to, jarring, setting plugs, removing safety valves, and the like.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values. Accordingly, the protection sought herein is as set forth in the claims below.

I claim:
1. A cable comprising:
   a. a central component; and,
   b. a layer of strength members, the layer comprising at least three (3) strength members, wherein the layer is disposed adjacent the central component at a lay angle, and wherein each strength member comprises;
      i. a central filament, and
      ii. at least three (3) filaments helically disposed adjacent the central filament;

wherein at least one of the filaments comprises a high strength core and a corrosion resistant alloy clad, the corrosion resistant alloy forming the outer layer of the at least one filament, and wherein the high strength core is steel and the corrosion resistant alloy clad is an alloy comprising nickel in an amount from about 10% to about 60% by weight of total alloy weight, chromium in an amount from about 15% to about 30% by weight of total alloy weight, molybdenum in an amount from about 2% to about 20% by weight of total alloy weight, and cobalt in an amount up to about 50% by weight of total alloy weight.

2. A cable according to claim 1 wherein the corrosion resistant alloy clad is extruded over the high strength core, and the clad and core are drawn to prepare the filaments.

3. A cable according to claim 1 wherein the corrosion resistant alloy clad is at least one sheet of corrosion resistant alloy formed over the high strength core, and the clad and core are drawn to prepare the filaments.

4. A cable according to claim 1 wherein a polymer jacket encases the central filament.

5. A cable according to claim 4 wherein the polymer jacket encases filaments disposed adjacent the central filament.

6. A cable according to claim 1 wherein a polymer jacket encases the filaments disposed adjacent the central filament.

7. The electrical cable according to claim 1 wherein the central component is an insulated conductor.

8. The electrical cable according to claim 1 wherein a polymer jacket matrix encases the central component and filaments disposed adjacent the central filament.

9. The electrical cable according to claim 1 wherein the strength members are helically disposed around the central component.

10. The electrical cable according to claim 8 wherein the polymer jacket further comprises a fiber reinforcing material.

11. The electrical cable according to claim 1 comprising at least four (4) strength members helically disposed around the central component.

12. The electrical cable according to claim 1 comprising at least six (6) filaments helically disposed adjacent the central filament, and a polymer jacket matrix encasing the central filament and filaments disposed adjacent the central filament.

* * * * *